3,784,682
DENSIFYING METAL HYDRIDES WITH HIGH TEMPERATURE AND PRESSURE

Leonard M. Niebylski, Birmingham, Mich., assignor to Ethyl Corporation, Richmond, Va.
No Drawing. Continuation-in-part of abandoned application Ser. No. 392,370, Aug. 24, 1964. This application Apr. 9, 1968, Ser. No. 721,135
Int. Cl. C01b 6/00, 6/06
U.S. Cl. 423—645     8 Claims

ABSTRACT OF THE DISCLOSURE

A method of increasing the density of a hydride of a metal of Groups II-A, II-B, III-A and III-B of the Periodic Table which comprises subjecting a hydride to a pressure of from about 50,000 p.s.i. to about 900,000 p.s.i. at or above the fusion temperature of the hydride; i.e., between about 65° C. to about 325° C. Beryllium hydride obtained from this process has a density of at least 0.69 g./cc.

---

This application is a continuation-in-part of my co-pending application Ser. No. 392,370, filed Aug. 24, 1964, now abandoned.

BACKGROUND OF THE INVENTION

Metal hydrides find use in many applications. For example, reaction with water allows their use as a ready means for hydrogen generation. Densification of a metal hydride allows a greater amount of hydrogen to be evolved per unit volume of hydride.

Certain metal hydrides, notably beryllium hydride, find use as rocket fuel components because of their uniquely high specific impulse. However, because beryllium hydride, for example, has a relatively low specific density, propellants containing beryllium hydride as a fuel also have a low specific density, resulting in relatively low delivered impulse per unit volume. Therefore, increasing the density of beryllium hydride would aid in producing an even greater delivered impulse per unit volume and allow greater flexibility in the construction of rocket motors.

Beryllium hydride has been synthesized by Coates and Glockling, J. Chem. Soc. 25–26 (1954), by the pyrolysis of di-tertiary butyl beryllium etherate and by Head, Holley and Rabideau, J. Am. Chem. Soc. 29, 3687 (1957), using ether-free di-tertiary butyl beryllium. More recently, a superior product has been obtained by the pyrolysis of tertiary butyl beryllium etherate dissolved in a high-boiling inert solvent (co-pending application Ser. No. 176,865, filed Feb. 26, 1962). However, the beryllium hydride products of the above synthetic processes are without exception amorphous in structure, and as a result are characterized by a relatively low density, 0.57 to 0.67 gram per cm.$^3$, which limits their suitability for this application.

Methods of increasing the density of a material are known in the metallurgical art. For example, Jones, Fundamental Principles of Powder Metallurgy, Edward Arnold (Publishers) Ltd., London (1960), in the chapter on pressing discusses increasing the density of a metal powder by hot-pressing (pp. 351–355). However, this method increases only the bulk density and does not affect the true density. That is, by this method only theoretical or near theoretical densities can be obtained by making the material quite free from porosity (p. 354). The true density remains the same.

SUMMARY OF THE INVENTION

The process of this invention provides a practical method of increasing the true density of hydrides of metals of Groups II-A, II-B, III-A and III-B of the Periodic Table. More specifically, true densities of said metal hydrides may be substantially increased by subjecting a hydride to superatmospheric pressures at or above fusion temperatures. When beryllium hydride is subjected to this process, a material having a density of at least 0.69 g./cc. is obtained. It may or may not be crystalline.

DESCRIPTION OF THE PREFERRED EMBODIMENT

According to the method of this invention, when a metal hydride, such as beryllium hydride, in an amorphous form, is subjected to superatmospheric pressures at the fusion temperature or higher, the true density of the hydride is increased appreciably over the true density of said hydride in its original amorphous form.

The metal hydrides whose densities can be increased according to this invention are hydrides of the elements of Groups II-A, II-B, III-A and III-B, including the lanthanum series of rare earth elements; that is, those elements having an atomic number between 58 and 71 inclusive. Thus, among the metal hydrides that can be used are the hydrides of the elements of Group II-A of the Periodic Table; that is, beryllium hydride, magnesium hydride, calcium hydride, strontium hydride, and barium hydride. Likewise, the hydride can be zinc hydride, cadmium hydride or mercury hydride; that is, a hydride of an element of Group II-B of the Periodic Table. Similarly, the hydride of an element of Group III-A of the Periodic Table can be employed. Thus, boron hydride, aluminum hydride, gallium hydride, indium hydride, and thalium hydride can be used. Also, the hydride of an element of Group III-B of the Periodic Table can be used; to wit: scandium hydride, yttrium hydride, lanthanum hydride and the hydrides of elements of the lanthanide and actinide series of rare earth elements; that is, those elements having atomic numbers from 58 to 71 inclusive. Accordingly, cerium hydride, praseodymium hydride, neodymium hydride, promethium hydride, samarium hydride, europium hydride, gadolinium hydride, terbium hydride, dysprosium hydride, holmium hydride, erbium hydride, thulium hydride, ytterbium hydride, and lutecium hydride can be used in accordance with this invention.

The hydrides of beryllium and aluminum are preferred in this invention as they are most susceptible to the process described herein. Beryllium hydride is most highly preferred as its density is particularly increased by the techniques of this invention.

The density increase is accomplished by fusing the particles of a hydride. The term "fusing" as used here means that the particles of a hydride flow into one another or coalesce forming a coherent structure. The temperature at which this takes place is called fusion temperature. Definite changes in the physical properties of the material take place at the point of fusion. For example, while prior to fusion the amorphous hydride is opaque, at the point of fusion, this material becomes clear and transparent similar to glass. The degree of clarity depends on the degree of purity of the hydride. That is, if beryllium hydride is contaminated with beryllium metal or beryllium oxide, then the degree of clarity of the fused hydride will be directly proportional to the amount of the impurities since these impurities themselves do not undergo fusion.

Fusion of the metal hydride is readily accomplished by control of the temperature and pressure imposed on the material. The pressure can be either mechanical, gas pressure or hydrostatic. Gas pressures generally have to be quite a bit higher at any particular temperature than is necessary with mechanical or hydrostatic pressure. Similarly, hydrostatic pressures should be somewhat higher than mechanical pressures.

The greater the pressure, the lower the temperature required to accomplish fusion of a metal hyride. The reverse is also true. However, no fusion can be obtained at the atmospheric pressure or at the room temperature. Thus, a pressure of at least 50,000 p.s.i. and a temperature of at least 65° C. is required to accomplish fusion and the increase in density according to the process of this invention. For beryllium hydride, preferably a pressure of over 75,000 p.s.i. and most preferably over 100,000 p.s.i., and a temperature of over 100° C. and most preferably over 135° C. is employed.

The particular temperature-pressure relationship at which a particular metal hydride is fused depends on several factors, among which are purity of the metal hydride, and origin of the metal hydride; that is, whether it was formed pyrolytically or metathetically. Pyrolytically and metathetically formed beryllium hydride is generally readily fused at a temperature of from 135° to 210° C. and under a pressure of at least 50,000 p.s.i.

In order to pyrolytically prepare a metal hydride, an appropriate organometallic compound is heated and decomposed to the hydride. For example, di-tert-butyl beryllium etherate can be heated by solution pyrolysis at 190–200° C. for two to four hours to form beryllium hydride. Solution pyrolysis can be accomplished by separately heating a high boiling saturated hydrocarbon, for example, to about 190–200° C., heating an organometallic compound (e.g. to about 135° C.) and contacting the two, resulting in decomposition of the organometallic compound to $BeH_2$. Good purities can be obtained. For example, when using an organoberyllium, purities of $BeH_2$ of about 90 weight percent can be obtained.

Pyrolysis to the metal hydride will also take place when an organometallic is heated, e.g., as a vapor or liquid, for several hours; e.g., an organoberyllium (neat) can be heated at 185–195° C. for 3 to 4 hours to form $BeH_2$. With the preparations described, pyrolysis can be catalyzed; e.g., by dissolving an alkyl lithium in the hydrocarbon. Other such catalysts include organic derivatives of the Group I metals, such as sodium and potassium. Pyrolysis can also be accomplished in a hydrogen atmosphere. For example, diethylberyllium can be pyrolyzed by heat under hydrogen pressure to form beryllium hydride. Examples of such preparation are as follows:

Example 1

Beryllium hydride was obtained by solution pyrolysis of di-tert-butyl beryllium etherate as follows.

A reactor equipped with heating means, temperature measuring means, a stirrer, a reflux condenser having its outlet vented through a bubbler, and a feed line was flushed with an inert gas (nitrogen or argon) and heated. A high-boiling liquid hydrocarbon was charged to the reactor in a ratio of 1.5 to 3 times the volume of di-tert-butyl beryllium etherate to be pyrolyzed. When the solvent reached a temperature of 195–200° C., addition of the di-tert-butyl beryllium etherate was started. Pyrolysis occurred very rapidly and beryllium hydride precipitated immediately. After completion of the addition, gas evolution dropped off rapidly and ceased after from about 5 to 10 minutes. Immediately thereafter, the resultant hot slurry was filtered, the filter cake washed with hexane or petroleum ether and then dried. The products were white to a somewhat gray in appearance and had densities of from 0.63 to 0.67 g./cc. The following table summarizes the conditions and results of several runs.

TABLE I

[Solution pyrolysis]

| Run | Solvent | Ratio solvent/ DTBBE[1] | Addition time, min. | Temp., °C. | $BeH_2$, wt. percent | Density, g./cc. |
|---|---|---|---|---|---|---|
| 1 | Dodecane | 3/1 | 20 | 195 | 93.4 | 0.65 |
| 2 | do | 3/1 | 50 | 210 | 90.8 | 0.67 |
| 3 | do | 1.5/1 | 50 | 195 | 92.7 | 0.65 |
| 4 | do | 1.5/1 | 20 | 210 | 92.9 | 0.63 |
| 5 | Kerosene | 2/1 | 34 | 197–200 | 91.3 | 0.63 |
| 6 | Bayol 35 [2] | 3/1 | 30 | 197–202 | 90.1 | 0.67 |
| 7 | do | 3/1 | 60 | 191–196 | 93.5 | 0.66 |
| 8 | do | 3/1 | 70 | 191–198 | 92.5 | 0.66 |
| 9 | do | 3/1 | 100 | 196–200 | 94.3 | 0.65 |
| 10 | do | 3/1 | 90 | 197–200 | 94.8 | 0.65 |

[1] Di-tert-butyl beryllium etherate.
[2] A refined kerosene with a boiling range of about 200–250° C.

In like manner, triethylaluminum etherate is pyrolytically decomposed to aluminum hydride. Similarly, dimethylborane yields boron hydride on decomposition. Also, dibutylcadmium is pyrolytically decomposed to cadmium hydride.

Example 2

Beryllium hydride was obtained by neat pyrolysis of di-tert-butyl beryllium etherate as follows.

Di-tert-butyl beryllium etherate was added to a vessel equipped with heating means, temperature measuring means, vacuum creating means and pressure measuring means. The vessel was heated and the pressure was brought down to 60 mm. Hg at 170° C. At 170–175° C. the pressure was dropped to 15–20 mm. Hg and to 1 mm. Hg at 180–195° C. The temperature was raised to about 200° C. and held there for about 2½ hours. It was then raised to about 205–211° C. over a one-hour period, with concurrent lowering of pressure to below 1 mm. Hg, and was maintained at that temperature for less than one hour or until the pressure rose to 1 mm. Hg. The purity of beryllium hydride obtained by this method varied from 74.8 to 77%.

In like manner, triethylgallium is pyrolytically decomposed to gallium hydride. Similarly, trimethylindium yields indium hydride. Also, diisobutylmercury is pyrolytically decomposed to mercury hydride.

Example 3

Beryllium hydride was obtained by neat pyrolysis of di-tert-butyl beryllium etherate, catalyzed by the presence of one of dimethyl beryllium, beryllium borohydride, lithium hydride and tert-butyl lithium. The procedure of Example 2 was otherwise followed. The products obtained by this method range in purity from about 75 to about 95 percent beryllium hydride.

In like manner, triethylthallium is pyrolytically decomposed to thallium hydride. Similarly, di-n-butylzinc yields zinc hydride. Also, triphenyl aluminum is pyrolytically decomposed to aluminum hydride.

Beryllium hydride was also obtained by hydrogenolysis of diethyl beryllium. Reactions were run in an autoclave without agitation. The diethyl beryllium was charged into a glass vial which was placed in the autoclave. The pressure was raised to 9,000 p.s.i. $H_2$ by a pump. On heating, the pressure rose to about 11,000 p.s.i.

In like manner, magnesium benzoate is pyrolyzed, with heat and hydrogen pressure to yield magnesium hydride. Similarly, calcium benzoate is pyrolyzed, under hydrogen, to yield calcium hydride. Also, strontium acetate yields, on such pyrolysis, strontium hydride. Other compounds that can be so used to yield metal hydrides include: barium malonate, scandium oxalate, lanthanum acetate, cerium benzoate, praseodymium acetate, neodymium acetate, samarium acetate, gadolinium acetate, dysprosium acetate, erbium acetate, thulium oxalate, ytterbium acetate and thallium phenoxide. Still other organometallic compounds that can be used include cyclomatic compounds of the Groups II-A, II-B, III-A and III-B metals as found in U.S. Pat. 2,818,416, which compounds are incorporated herein by reference.

Among the organoberyllium compounds that can be used are various dialkyl beryllium compounds such as diisopropyl beryllium or di-tert-butyl beryllium. Diethyl beryllium, however, is uniquely useful since it has a low molecular weight, it is readily obtainable in pure ether-free condition and it is a liquid at room temperature, permitting visual estimation of the progress of the hydrogenolysis reaction as solid $BeH_2$ is produced.

As noted, the meal hydride can also be prepared metathetically; the following general reactions, among others, can be used:

(1) $NR_mM_1H + MR_n \rightarrow MH_n + 2R_{m+1}M_1$
(2) $NR_mM_1H + MX_n + NR_2O \rightarrow MH_n + NR_mMX \cdot R_2O$ where M is a metal for which the hydride is desired, $M_1$ is a Group II, III or IV metal, which may include M, $n$ and N are both the major valence of M ion, $m$ is one less than the valence of $M_1$ ion, R is an organic radical that doesn't form a chelate with M and X is halogen such as chlorine, bromine, iodine or fluorine. Examples of useable organic radicals can include alkyl, aryl, alkaryl and ethers, including such groups containing inorganic substituents such as amino. In general, alcohols, esters, acetones and aldehydes should be avoided as they tend to form chelates or alkoxides which tend to interfere with the reaction. Examples of usable metals include aluminum and boron. The following examples illustrate metathetical preparations.

Example 4

To a reaction vessel equipped with heating means, temperature measuring means and reagent adding means are added 100 parts by weight of diethyl aluminum hydride and 50 parts by weight of diethyl beryllium. The vessel is heated to 130° C. and maintained at that temperature for several hours. Diethyl ether is then added and solids containing beryllium hydride are precipitated. These solids are filtered, washed with ether and dried under reduced pressure. Analysis of a similar preparation shows the solids to contain 65.7 weight percent beryllium hydride.

In a similar manner, triethyl aluminum is reacted with diethyl boron hydride to yield aluminum hydride. Likewise, dimethyl borane yields boron hydride on reaction with diethyl aluminum hydride. Also, dibutylcadmium can be similarly metathetically converted to cadmium hydride. Likewise, a metathetical reaction, as above, of triethylgallium yields gallium hydride. Other compounds that can be metathetically reacted to form the corresponding hydride include dibutylzinc, triethylthallium, dibutylmercury, and trimethylindium.

Example 5

To a reaction vessel equipped with heating means and temperature measuring means and containing toluene as a solvent are added 50 parts by weight of beryllium chloride dietherate and 100 parts by weight of diethyl aluminum hydride. The vessel is heated to 130° C. and maintained at that temperature for one hour, during which time solids form. The solids are filtered off and dried for an hour at 130–150° C. at 1–5 mm. pressure. Solids from a similar preparation have been found to comprise, by weight, 71.9 percent beryllium hydride, 2.4 percent beryllium metal, 10.1 percent ethyl groups, 5.1 percent chlorides, 6.0 percent aluminum, no ether and 3.8 percent unknown material.

By other similar reactions, beryllium hydride was obtained having from 71.8–77.3 weight percent purity.

Similarly, magnesium chloride etherate is reacted with diethyl aluminum hydride to yield magnesium hydride. Likewise, calcium bromide etherate metathetically reacts with diethyl aluminum hydride to form calcium hydride. Strontium iodide etherate can similarly be used to metathetically form strontium hydride. Examples of other compounds that metathetically form the corresponding hydride, as above, include barium fluoride etherate, radium chloride etherate, scandium bromide etherate, yttrium iodide etherate and lanthanum fluoride etherate.

As pointed out, the method of this invention increases the true density of metal hydrides mentioned above. True density, as used herein, means the highest theoretical density of a substance in a particular form. This is contrasted with bulk density which almost always will be lower than true density because of the presence of some air pockets in a bulk. In other words, true density is the highest density of a material which cannot be further increased by physical means, such as pressure.

By employing the method of this invention unexpectedly the true density of metal hydrides may be increased. To illustrate the difference between increasing the bulk density and the true density of beryllium hydride, there is presented the following example.

Example 6.—Comparison of density increases

Beryllium hydride, prepared by one of the methods described above had a density between 0.64 and 0.65 g./cc. Using a mechanical press having pressure measuring means, the hydride was subjected for one-half hour to 75K p.s.i. at a temperature which was below fusion. The resulting beryllium hydride had a density between 0.66 and 0.67 g./cc.

This operation was repeated using beryllium hydride from the same source, but in this case, while the pressure was applied, the hydride was heated to 135–145° C., that is, about 10° C. above the fusion temperature. The resulting density of most of the sample was between 0.69 and 0.70 g./cc., and part of the sample had a density between 0.70 and 0.71 g./cc. In both instances, the densities were determined by the same method; i.e., by the sink-float method as described below. It should be noted that the method of this invention does not cause decomposition of the hydride. Thus, the increase in density is not due to the oxidation of the hydride to the free metal.

From the above it is clear that by merely applying a pressure to the hydride, the density did not go over 0.67 g./cc., which is approximately the theoretical density of an amorphous beryllium hydride in its original state. However, when the same pressure was applied, but above the fusion temperature, the density increased substantially over the theoretical density of the starting material. Thus, the increase of density of beryllium hydride above 0.69 g./cc. was not due merely to the physical compaction of the material, but due to some type of change in the molecular structure. That is, it is quite apparent that under the fusion conditions, the molecules rearranged themselves, at least partially, from a random array to a more orderly space array, thereby resulting in a more compact structure (thus, of higher density).

Fusion of metal hydrides generally can be accomplished at pressures of from 50,000 p.s.i. to 350,000 p.s.i. or 900,000 p.s.i., or higher, at a temperature of from about 65° C. to about 325° C., depending on the hydride and method of preparation. The following examples describe the fusion of metal hydrides whereby a material having an increased density is obtained.

Example 7

Using a mechanical press having heating means, temperature measuring means and pressure measuring means, 0.1 g. samples of pyrolytically formed beryllium hydride, having purities of more than 95 percent, were subjected, for one-half hour each, to pressures and temperatures sufficient to cause the samples to fuse. The following table summarizes the pressure and temperature ranges used to obtain fusion.

TABLE II

| Pressure, p.s.i.: | Fusion temperature range, °C. |
|---|---|
| 50,000 | 130–140 |
| 75,000 | 130–140 |
| 90,000 | 130–140 |
| 350,000 | About 65 |

In a similar manner, scandium hydride and gallium hydride are fused when individually subjected to 60,000 p.s.i. and a temperature of 170° C. Likewise, cerium hydride, gadolinium hydride, and ytterbium hydride are fused when subjected to 300,000 p.s.i. at 85° C.

Example 8

Using a mechanical press similar to that of Example 7, samples of aluminum hydride, obtained from three sources, were subjected to pressures between 50,000 p.s.i. and 100,000 p.s.i. at temperatures between 65° C. and 125° C. which caused the samples to fuse. The time of fusion varied from 5 minutes to 60 minutes.

Example 9

Using the mechanical press of Example 7, 50 mg. samples of metathetically formed beryllium hydride were subjected, for one-half hour each, to pressures and temperatures sufficient to cause the samples to fuse. Two methods were used to prepare the samples. Those samples designated "A" in the following table were prepared by the method described in Example 6 by reaction of diethyl beryllium with diethyl aluminum hydride. Those samples designated "B" were prepared by the method described in Example 7 by reaction of beryllium chloride dietherate and diethyl aluminum hydride. The pressure and temperature ranges used are as follows.

TABLE III

| Run | $BeH_2$ preparation | Pressure, p.s.i. | Temperature, °C. |
|---|---|---|---|
| 30 | A | 50,000 | 141–154 |
| 31 | A | 75,000 | 141–154 |
| 32 | A | 90,000 | 125–128 |
| 33 | B | 35,000 | 132–140 |
| 34 | B | 75,000 | 96–104 |
| 35 | B | 75,000 | 77–85 |

Similarly, pyrolytically prepared aluminum hydride, indium hydride, and lutetium hydride are each fused at a pressure of 70,000 p.s.i. at 135° C. Likewise, metathetically prepared praseodymium hydride and aluminum hydride are each fused at 95,000 p.s.i. at 100° C. Also, pyrolytically prepared magnesium hydride and terbium hydride are each fused at 50,000 p.s.i. at 130° C. Further, yttrium hydride is fused at 280,000 p.s.i. at 85° C.

Regardless of the method of preparation of the metal hydride, the rate of fusion is somewhat dependent on the temperature at which pressure is applied to the specimen. Generally, and particularly with beryllium hydride, if pressure is not applied until the hydride has been substantially heated, fusion takes place very rapidly.

As noted, the metal hydride can be fused using hydrostatic pressure. This method involves pressure-treating a powdered metal hydride suspension in a saturated high boiling hydrocarbon. For example, Bayol-90 or dodecane can be used. The liquid-solid mixture can be placed in a hardened steel bomb, for example, and pressure can be applied with a plunger. Generally, and particularly with beryllium hydride, it is important that the volume of solids comprising the unfused metal hydride suspension be at least as great as one-half the volume of the liquid and, preferably, as great as the volume of the liquid.

Fusion generally changes the physical appearance of the metal hydride. For example, freshly fused beryllium hydride is generally a transparent yellow-glassy mass which on aging will gray. It is generally sufficiently clear so as to allow printed matter to be clearly viewed through it. The fused beryllium hydride is hard but brittle and will shatter into splinters much as will glass. Its strength is increased with an increase in annealing time.

As noted, fusion of metal hydrides can be accomplished by subjecting it to certain temperature-pressure conditions. Temperatures in excess of the minimum needed at any specific pressure can also be used. However, the temperature should not be so high as to cause decomposition of the hydride. Thus, it can be seen that the maximum temperature will vary with the particular hydride, but it will generally be between 65° C. and 325° C. Likewise, pressures in excess of the minimum needed for any specific temperature can be used. Generally, fusion will take place much faster at higher temperatures and pressures.

By fusing a metal hydride as described, and controlling the temperature and pressure, the density of the metal hydride can be increased. Thus, by maintaining the metal hydride in the fused state under pressure, for a short time, and then releasing the pressure without the temperature being above the decomposition point of the fused metal hydride, metal hydrides of greater density are obtained. In general, the higher the pressure, at any particular temperature, the denser the metal hydride produced. Similarly, the higher the temperature, but subject to the above limitation, at any particular pressure, the denser the metal hydride produced. The following example illustrates the effect of pressure with respect to the density of the fused hydride.

Example 10

Using the mechanical press of Example 7, 50 mg. samples of beryllium hydride, prepared pyrolytically as in Example 3 and having a purity of about 95 weight percent, were subjected, for one-half hour each, to pressures and temperatures sufficient to cause the samples to fuse. Densities of the fused material were measured by the "sink or float" method; that is, the samples were placed in pure hydrocarbons of calibrated densities to determine whether they would sink or float. The density ranges obtained at various pressures are given in the following table.

TABLE IV
[$BeH_2$ density change with pressure]

| Pressure, p.s.i. | Density range of fused material, g./cc. | |
|---|---|---|
| | Sink | Float |
| 10,000 | 0.641 | 0.651 |
| 35,000 | 0.651 | 0.661 |
| 50,000 | 0.670 | 0.675 |
| 75,000 | 0.701 | 0.708 |
| 90,000 | 0.701 | 0.708 |
| 100,000 | 0.718 | 0.731 |

Similarly, other metal hydrides of increased densities are provided by the above procedure. Thus, several samples each of aluminum hydride, strontium hydride and zinc hydride are subjected to different pressures for one-half hour at temperatures sufficient to cause the samples to fuse. Increases in density for each hydride are found with samples subjected to increased pressures. Likewise, when several samples of holmium hydride are subjected to increased pressures for the same period of time, increases in densities for the hydride are observed.

Not only can the density of a metal hydride be increased by the above fusion techniques, but the carbon content of carbon-contaminated metal hydrides can be reduced by annealing the metal hydride in its fused state. The carbon content comprises elemental carbon and/or chemically combined carbon, such as organic materials. If an unfused hydride is heated without fusion, its carbon content is not lowered but is actualdly relatively increased due to the decomposition of the metal hydride to metal. By fusing the metal hydride, and maintaining it in a fused state under controlled temperature and pressure, the carbon content of the metal hydride is reduced substantially without increasing or changing the hydrogen content. Further, no metal is generally detected in such fused and annealed material, nor generally, does such annealing produce a color change. The following example illustrates such annealing.

Example 11

Five samples of pyrolytically formed beryllium hydride having purities of 95.6 weight percent were heated to 175° C. for varying amounts of times. Three of the samples were subjected to mechanical pressures, during heating, of 16,000 p.s.i., using the mechanical press of Example 7. The following table summarizes the conditions and analyses of the products.

TABLE V

| Sample treatment | | | | Analysis | | |
|---|---|---|---|---|---|---|
| Pressure, p.s.i. | Temp., °C. | Time, hrs. | Physical state | Carbon, wt. percent | Hydrogen, wt. percent | BeH$_2$ purity, percent |
| Original specimen | | | Not fused | 2.83 | 17.9–18.0 | 95.6 |
| 15 | 175 | 18 | do | 2.90 | 17.8–17.9 | 94.9 |
| 15 | 175 | 72 | do | [1] 3.20 | [1] 16.4–16.6 | 87.1 |
| 16,000 | 175 | 18 | Fused | 2.00 | 17.8–17.9 | 95.8 |
| 16,000 | 175 | 36 | do | 1.87 | 17.7–17.9 | 95.8 |
| 16,000 | 175 | 72 | do | 1.12 | 17.5–17.6 | 95.2 |

[1] Metal detected by X-ray diffraction.

Similarly, when aluminum hydride, barium hydride and boron hydride are each fused and held at fusion temperature for 12 hours, the carbon content of each is significantly lowered. Likewise, the carbon contents of cadmium hydride, samarium hydride and erbium hydride are effectively lowered by maintaining each hydride in the fusion state for 40 hours. Also, the carbon contents of uranium hydride and californium hydride are similarly lowered by maintaining each hydride in a fused state for 90 hours.

Generally fusions will occur with any pure metal hydride as described. The lower purity samples, e.g., 80 percent, will generally lack strength and be difficult to prepare. Quite often brown carbonaceous materials will be interspersed on the surface of fused hydrides from such impure samples. These carbon spots become less apparent as hydride purity increases.

By conducting the fusion process just described, metal hydrides of increased density are provided. Thus, beryllium hydrides are produced having a density of from 0.69 to 0.88 g./cc. Accordingly, an embodiment of this invention is the provision of such denser metal hydrides and particularly the provision of beryllium hydrides having a density of 0.69 to 0.88 g./cc.

Using the mechanical press of Example 7, 50 mg. of 90 weight percent pure pyrolytically formed beryllium hydride is subjected to a pressure of 50,000 p.s.i. at a temperature of 190 C. for an hour during which time the beryllium hydride is fused. The resultant fused beryllium hydride has a density of 0.69 g./cm.$^3$.

In like manner, 50 mg. of 85 weight percent pure metathetically formed beryllium hydride is subjected to 90,000 p.s.i. pressure at a temperature of 135° C. for 45 minutes. Fusion occurs and portions of the resultant fused beryllium hydride have a density as high at 0.76 g./cc. with an average density of 0.73 g./cc.

Similarly, 50 mg. of 95 weight percent pure pyrolytically formed beryllium hydride is subjected to a pressure of 900,000 p.s.i. at a temperature of 135° C. The resultant beryllium hydride is fused and has a density of 0.88 g./cm.$^3$.

Beryllium hydride having densities between 0.69 and 0.88 g./cc. are also obtained when amorphous beryllium hydride is heated from 5 minutes to two hours at temperatures between 100° C. and 325° C. under pressures of between 100,000 p.s.i. and 350,000 p.s.i.

Similarly, aluminum hydride, radium hydride, neptunium hydride and mercury hydride are subjected to and held at pressures and temperature conditions sufficient to cause their fusion. The resultant hydrides are denser material than heretofore existed. Likewise, thulium hydride are subjected to and held at pressure and temperature conditions sufficient to cause their fusion to denser material than heretofore existed.

For example, to obtain a higher density aluminum hydride, it is fused for about one-half hour at about 65° C. at a pressure of 75,000 p.s.i. Similarly, aluminum hydride of increased density is obtained when it was kept for about 15 minutes at a temperature of about 125° C. under a pressure of 250,000 p.s.i. Preferably, when higher temperatures are employed with aluminum hydride, the fusion is carried out under inert gas to minimize the possibility of oxidation to aluminum oxide.

Without limiting this invention to any one theory, it is believed that the increase of density accomplished by the instant invention results from a change in molecular arrangement of a metal hydride from a random array to a more regular space array.

Metal hydrides having increased densities obtained by the method of this invention may or may not be crystalline. When amorphous hydrides are subjected to the fusion process herein described, the metal hydride molecules start arranging themselves into a more orderly array. The orderly arrangement of molecules may be in one dimension, two dimensions or three dimensions. True crystallinity does not result in a hydride unless a three dimensional ordering is achieved. However, density increases as soon as a molecular order in only one dimension is achieved.

Beryllium hydride having the density between 0.69 and 0.88 g./cc. prepared by the method of the invention exists in both crystalline and non-crystalline forms as discussed. Table VI below gives average $d$-values obtained by X-ray diffraction using a beryllium hydride sample which was fused by the method of this invention. As the values clearly indicate, this particular sample was crystalline and has a density of 0.80–0.88 g./cc.

TABLE VI

Average $d$-values for phase 332 from sedimented fraction of 0.80–0.88 g./cc. density

| $d$: | I/I | $d$: | I/I |
|---|---|---|---|
| 7.06 | W | 1.474 | S |
| 4.59 | W | 1.341 | S |
| 3.80 | MS | 1.287 | W |
| 3.30 | VVS | 1.263 | MW |
| 3.05 | MW | 1.163 | MW |
| 2.89 | MW | 1.111 | W |
| 2.79 | MW | 1.099 | M |
| 2.58 | MW | 1.043 | MS |
| 2.47 | M | 1.020 | VW |
| 2.33 | VS | 0.995 | MW |
| 2.20 | W | 0.953 | W |
| 2.09 | MW | 0.916 | MW |
| 1.981 | M | 0.897 | W |
| 1.898 | S | 0.881 | M |
| 1.788 | W | 0.858 | VW |
| 1.723 | VW | 0.825 | VW |
| 1.649 | M | 0.802 | MW |
| 1.510 | MW | 0.799 | MW |

Having fully described the process and novel compositions of this invention, it is desired that this invention be limited only by the lawful scope of the appended claims.

I claim:

1. A method of increasing the density of a hydride of a metal by fusion, said metal being a member of one of Groups II–A, II–B, III–A and III–B of the Periodic Table, said method comprising subjecting said hydride to a pressure of from about 50,000 p.s.i. to about 900,000 p.s.i. at a temperature from about 65° C. to about 325° C., said pressure and temperature being sufficient to fuse said hydride.

2. The method of claim 1 wherein said hydride is beryllium hydride.

3. The method of claim 1 wherein said hydride is aluminum hydride.

4. The method of claim 1 wherein said hydride is unfused beryllium hydride, said pressure is from 50,000 to 900,000 p.s.i. and said temperature is from about 135° C. to about 210° C., such that said pressure and temperature are sufficient to fuse said unfused beryllium hydride.

5. The method of claim 4 wherein said unfused beryllium hydride is pyrolytically-formed unfused beryllium hydride.

6. The method of claim 4 wherein said unfused beryllium hydride is metathetically-formed unfused beryllium hydride.

7. The method of claim 4 wherein said pressure is from about 75,000 p.s.i. to about 350,000 p.s.i.

8. Beryllium hydride having a density of at least 0.69 g./cc. prepared by the method of claim 1.

References Cited

UNITED STATES PATENTS 1,130,533    3/1915    Pictet _____ 264—65

OTHER REFERENCES

Kingery, Densification During Sintering in the Presence of a Liquid Phase, Jour. of Applied Physics.

LELAND A. SEBASTIAN, Primary Examiner

U.S. Cl. X.R.

23—293 R; 149—109; 423—263, 646, 647